(12) United States Patent
Logunov et al.

(10) Patent No.: US 9,158,080 B2
(45) Date of Patent: Oct. 13, 2015

(54) LIGHT-COUPLING APPARATUS AND METHODS FOR LIGHT-DIFFUSING OPTICAL FIBERS

(71) Applicant: Corning Incorporated, Corning, NY (US)

(72) Inventors: Stephan Lvovich Logunov, Corning, NY (US); Nikolay Timofeyevich Timofeev, St. Petersburg (RU)

(73) Assignee: Corning Incorporated, Corning, NY (US)

( * ) Notice: Subject to any disclaimer, the term of this patent is extended or adjusted under 35 U.S.C. 154(b) by 174 days.

(21) Appl. No.: 13/974,580

(22) Filed: Aug. 23, 2013

(65) Prior Publication Data

US 2015/0055915 A1    Feb. 26, 2015

(51) Int. Cl.
G02B 6/25 (2006.01)
G02B 6/42 (2006.01)
G02B 6/04 (2006.01)
G02B 6/06 (2006.01)
F21V 8/00 (2006.01)
G02B 6/12 (2006.01)
G02B 6/40 (2006.01)
G02B 6/02 (2006.01)

(52) U.S. Cl.
CPC .............. G02B 6/4298 (2013.01); G02B 6/001 (2013.01); G02B 6/0006 (2013.01); G02B 6/04 (2013.01); G02B 6/06 (2013.01); G02B 6/4214 (2013.01); G02B 6/02366 (2013.01); G02B 6/25 (2013.01); G02B 6/403 (2013.01); G02B 6/4292 (2013.01); G02B 2006/12038 (2013.01); G02B 2006/12166 (2013.01)

(58) Field of Classification Search
CPC .......... G02B 6/04; G02B 6/06; G02B 6/4214; G02B 6/4298; G02B 2006/12038; G02B 6/25; G02B 6/403; G02B 6/4292; G02B 6/0006; G02B 6/001; G02B 6/02366; G02B 6/0236
USPC ............................................................ 385/31
See application file for complete search history.

(56) References Cited

U.S. PATENT DOCUMENTS

| | | | | |
|---|---|---|---|---|
| 5,152,818 | A | * | 10/1992 | Berkey et al. ................... 65/412 |
| 5,548,676 | A | | 8/1996 | Savage, Jr. |
| 6,004,315 | A | * | 12/1999 | Dumont .......................... 606/15 |
| 8,870,857 | B2 | * | 10/2014 | Seymour et al. ................ 606/15 |
| 2005/0157992 | A1 | | 7/2005 | Peng |
| 2008/0019657 | A1 | * | 1/2008 | Maitland et al. .............. 385/140 |
| 2008/0236183 | A1 | * | 10/2008 | Iimura ............................. 62/264 |
| 2011/0112591 | A1 | * | 5/2011 | Seymour et al. .................. 607/3 |
| 2011/0122646 | A1 | | 5/2011 | Bickham |

(Continued)

FOREIGN PATENT DOCUMENTS

WO    2006102846    10/2006

*Primary Examiner* — Akm Enayet Ullah
(74) *Attorney, Agent, or Firm* — Svetlana Z. Short

(57) ABSTRACT

Light-coupling apparatus and methods for light-diffusing optical fibers are disclosed. The light-coupling apparatus includes a light-diffusing fiber bundle having an end section made up of tightly packed cores by removing the claddings. The spaces between the cores are filled with a material having a refractive index equal to or less than that of the cores. A light-emitting diode light source can be butt-coupled to the bundled-core end of the light-diffusing fiber bundle or can be coupled thereto via a reflective concentrator. A method of forming a flat and smooth end on a cleaved fiber that has a rough end is also disclosed.

14 Claims, 9 Drawing Sheets

(56) References Cited

U.S. PATENT DOCUMENTS

2011/0182552 A1 7/2011 Russert et al.
2012/0275178 A1 11/2012 Logunov
2013/0088888 A1 4/2013 Fewkes et al.

* cited by examiner

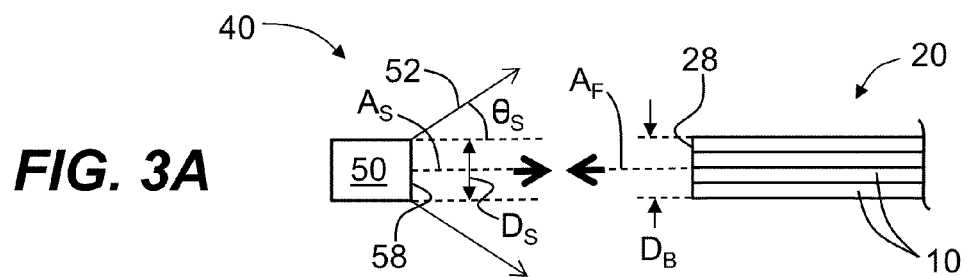
FIG. 3A
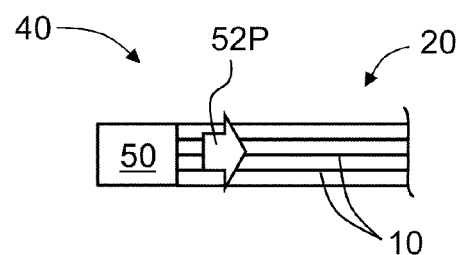
FIG. 3B
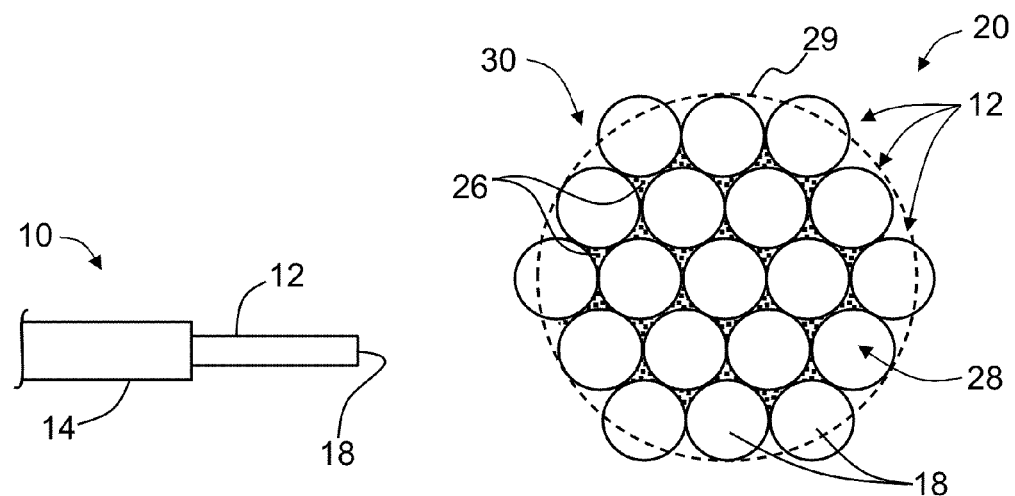
FIG. 4A
FIG. 4B

LIGHT-COUPLING APPARATUS AND METHODS FOR LIGHT-DIFFUSING OPTICAL FIBERS

FIELD

The present disclosure relates to optical fiber connectors and to light-diffusing fibers, and in particular relates to light-light-coupling apparatus and methods for light-diffusing optical fibers.

The entire disclosure of any publication or patent document mentioned herein is incorporated by reference.

BACKGROUND

Optical fibers are used for a variety of applications where light needs to be delivered from a light source to a remote location. Optical telecommunication systems, for example, rely on a network of optical fibers to transmit light from a service provider to system end-users.

Optical fibers are typically designed to efficiently deliver light from one end of the fiber to the other end of the fiber (usually over long distances), which requires that very little light escapes from the sides of the typical fiber. Yet, there are a number of applications such as special lighting, signage, or biological applications, including bacteria growth and the production of photo-bioenergy and biomass fuels, where select amounts of light need to be provided in an efficient manner to the specified areas.

To this end, light-diffusing optical fibers have been developed, such as described in U.S. Pat. No. 7,450,806, and U.S. Pre-Grant Publications US2012/0275180, US2011/0122646, and US2013/0107565. Light-diffusing optical fibers are configured to scatter light out of the fiber along the length of the fiber. Light-diffusing fibers are used in a variety of applications, such as light sources (see, e.g., WO 2013/055842 A1).

Light diffusing optical fibers can be optically coupled to a laser-diode light source with a coupling efficiency of greater than 90% due to the small and relative low numerical aperture (NA) of laser diodes. However, for certain applications, it is preferred to use light-emitting diodes (LEDs) as the light source. The coupling of an LED to a light-diffusing optical fiber is challenging because the core of a light-diffusing fiber can have a diameter that ranges from 125 µm to 250 µm and has a NA of about 0.35, while an LED has a size of about 1 mm or larger and a large NA, e.g., from about 0.86 and up to about 1.

In an optical system, the etendue is conserved. In geometric terms relating to a light source and an optical fiber, if $A_1$ and $A_2$ are respectively the size of a light source emitting area and the fiber core, and $NA_1$ and $NA_2$ are respectively the source and fiber numerical apertures, then $A_1 \cdot (NA_1)^2 = A_2 \cdot (NA_2)^2$. Consequently, the optical coupling between a light-diffusing optical fiber and an LED light source would be unacceptably low due to the mismatch between numerical apertures and emitting/receiving areas.

SUMMARY

An aspect of the disclosure is an optical fiber apparatus. The optical fiber apparatus has a plurality of light-diffusing optical fibers each having a cylindrical glass core with a refractive index $n_1$, and a surrounding cladding with a refractive index $n_2 < n_1$, wherein an end section of each light-diffusing optical fiber has the cladding removed to expose the core. The glass cores are arranged in a tight bundle with spaces between the cores. A transparent material of refractive index $n_M$ resides in the spaces, wherein $n_M \leq n_1$.

Another aspect of the disclosure is a light-coupling apparatus. The light-coupling apparatus includes the above-described optical fiber apparatus, which has an endface of a first size and shape. The light-coupling apparatus also includes an LED light source having an output end from which light is emitted and that has a second size and shape that is substantially the same as the first size and shape. The output end of the LED light source is interfaced with the endface of the optical fiber apparatus to establish a butt-coupling of the light from the LED into the optical fiber apparatus.

Another aspect of the disclosure is a light-coupling apparatus that includes the optical fiber apparatus as described above and having a numerical aperture $NA_B$ and an endface of a first size and a first shape. The light-coupling apparatus also includes a LED light source having a numerical aperture $NA_S > NA_B$, an output end of a second size smaller than the first size and having the substantially the first shape, wherein the output end emits light. The light-coupling apparatus also has a reflective concentrator operably disposed between the LED light source and the optical fiber apparatus so that at least a portion of the light from the LED light source reflects from the reflective concentrator and enters the endface of the optical fiber apparatus in a manner that substantially matches the numerical aperture $NA_B$ of the optical fiber apparatus.

Another aspect of the disclosure is a method of processing an end of a light-diffusing optical fiber having a core and a cladding surrounding the core. The method includes: cleaving the light-diffusing optical fiber to form a cleaved end wherein the core has a rough end; depositing an ultraviolet (UV)-curable material on the rough end; placing a non-stick UV-transparent plate against the UV-curable material and the cleaved end to form a flat surface of the UV-curable material; and illuminating the UV-curable material with UV light through the non-stick UV-transparent plate to cure the UV-curable material to form smooth and flat hardened surface at the cleaved end.

Another aspect of the disclosure is a light-coupling apparatus. The light coupling apparatus has a light-diffusing-fiber (LDF) bundle having a plurality of light-diffusing optical fibers each having a glass cylindrical core with a refractive index $n_1$, and a surrounding cladding with a refractive index $n_2 < n_1$, wherein an end section of each light-diffusing optical fiber has the cladding removed to expose the glass core. The glass cores are arranged in a tight bundle with spaces between the cores. A first transparent material of refractive index $n_{M1}$ resides in the spaces, wherein $n_{M1} \leq n_1$. The LDF bundle has an endface of a first size and first shape. The apparatus also has a LED light source having an output end having a second size and second shape that substantially match the first size and shape and that emits light. The apparatus further includes a transparent rod having first and second ends and disposed between and in contact with the endface of the LEF bundle and the output end of the LED light source. The apparatus also includes a housing having an interior that contains the LED light source, the transparent rod and the endface of the LDF bundle. The transparent housing has a sidewall that is generally transparent to the light from the LED light source and that scatters a portion of the light that travels within the sidewall.

Another aspect of the disclosure is a method of coupling light from a LED into a plurality of light-diffusing optical fibers each having a glass core and a cladding with respective refractive indices $n_1$ and $n_2$. The method includes: removing a portion of the cladding from an end section of each of the plurality of optical fibers to form exposed cores having respective core ends; arranging the exposed glass cores in a tight bundle that has spaces between the tightly bundled cores; filling the spaces with a transparent material having a refractive index $n_{M1}$, wherein $n_{M1} \leq n_1$ to define a light-diffusing core bundle having an endface that includes the core ends and a portion of the material; and directing light from the LED into the endface to travel within the cores and the material.

Another aspect of the disclosure is an optical fiber apparatus that includes a plurality of light-diffusing optical fibers arranged in a bundle. Each optical fiber has a numerical aperture (NA), a cylindrical glass core with a refractive index $n_1$, and a surrounding cladding with a refractive index $n_2 < n_1$. Each end section of each light-diffusing optical fiber has the cladding removed to expose the core. The exposed glass cores at the end sections of the optical fibers are fused together to form a solid-glass fused-core section at an end of the bundle. A lower-index clad material surrounds the fused-core section of the bundle to define a fused-core NA that substantially matches the single-fiber NA.

Additional features and advantages are be set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIGS. 3A and 3B are schematic side views of an example light-coupling apparatus that includes an LED light source and the LDF bundle of FIG. 2;

FIG. 4A is a side view of an LDF wherein an end portion of the cladding has been removed to expose the core in the process of forming an LDF core bundle at the end of an LDF bundle;

FIG. 4B is an end view of an example LDF bundle that includes an LDF core bundle end section;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Light-Diffusing Fiber

Figure 1:
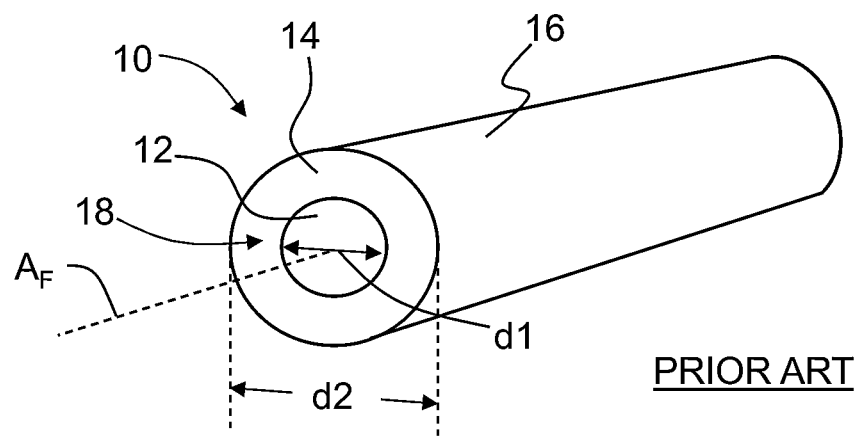
FIG. 1 is a front elevated view of an example light-diffusing optical fiber (LDF)

FIG. 1 is a front elevated view of an example light-diffusing optical fiber ("LDF") 10. LDF 10 has a cylindrical core 12 of diameter d1 surrounded by an annular cladding 14 that has an outer surface 16 and an inner diameter d1 (i.e., the same as the core) and an outer diameter d2. LDF 10 has a central axis $A_F$. In an example, LDF core 12 has inner and outer regions (not shown), with the outer region being annular and having randomly arranged and randomly sized voids therein. In an example, cladding 14 can include inner and outer regions, not shown. In an example, the core diameter d1 can range from 125 μm to 250 μm, and the cladding thickness d2 can range from 15 to 100 microns, LDF core 12 has a refractive index $n_1$ while LDF cladding 14 has a refractive index $n_2$, wherein $n_1 > n_2$. LDF 10 has an endface 18, which is preferably flat and in a plane perpendicular to central axis $A_F$. In the case where LDF core and/or cladding have different (i.e., multiple) sections, indices $n_1$ and $n_2$ can be representative of some select portion of the core and cladding, respectively.

LDF Bundle

Figure 2:
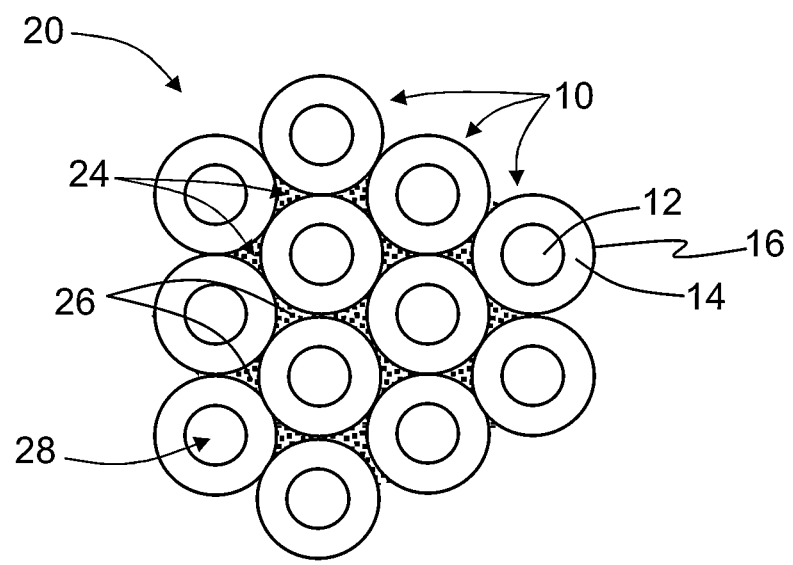
FIG. 2 is a front-on view of an example LDF bundle made up of nine LDFs, where the bundle includes a transparent material within the spaces between the fibers.

FIG. 2 is a front-on view of an example LDF bundle apparatus ("LDF bundle") 20 made up of nine LDFs 10. In an example, LDF bundle 20 includes spaces 24 between the bundled LDFs 10. In an example, spaces 24 are filed with air, while in another example the spaces are filled with a transparent material 26 of refractive index $n_{M1}$. In an example, material 26 is a UV-curable material such as a UV-curable polymer, e.g. a fluoroacrylate polymer. In one example, $n_{M1} \leq n_1$, while in another example $n_2 \leq n_{M1} \leq n_1$. LDF bundle 20 has an endface 28 defined at least in part by LDF endfaces 18. Endface 28 is also referred to as the input face 28 when light is inputted into LDF bundle 20 at the endface.

Coupling Assemblies

FIGS. 3A and 3B illustrate an example light-coupling apparatus 40 that includes an LED light source ("LED source") 50 and the LDF bundle 20 of FIG. 2. LED source 50 a light-source axis $A_S$ and that emits light 52 at a source numerical aperture $NA_S$. LDF bundle 20 has a numerical aperture $NA_B$, wherein $NA_S > NA_B$. In an example, $NA_B$ is about 0.35 and $NA_S$ is in the range from about 0.86 to about 1. FIG. 3A shows an angle $\theta_S$ that light rays make with respect to a line parallel to light-source axis AS. The LED source numerical aperture $NA_S = n_0 \cdot \sin(\theta_S)$, where $n_0$ is the refractive index of the surrounding medium, which is assumed to be air, in which case $n_0 = 1$. For LDF 10, $NA_F = (n_1^2 - n_2^2)^{1/2}$. LDF bundle 20 has a numerical aperture $NA_B = NA_F$.

LED source 50 has a front end (i.e., an output end) 58 having a size that corresponds to the light-emitting portion of the output end, and which in an example has a dimension (e.g., a diameter $D_S$ for a circular output end) of about 1 mm. In an example, endface 28 of LDF bundle 20 has a size that substantially matches the size and shape of output end 58 of LED light source 50. In an example, endface 28 is generally circular and has a diameter $D_B$ that in an example (e.g., for butt-coupling) is configured so that $D_S = D_B$.

FIG. 3B shows the output end 58 light source 50 interfaced with the input end 28 of LDF bundle 20. In this configuration, a portion 52P of light 52 from LED light source 50 falls within the numerical aperture $NA_B$ and travels down LDF fibers 10 as well as material 26. Light portion 52P travels as guided modes in LDF fibers 10, as well as in the cladding and through spaces 24, and through material 26 in the case where the spaces are filled with the material.

Simulations were carried out for the coupling configuration of FIG. 3B for an LDF bundle 20 made up of nine LDFs 10, and wherein cladding 14 included two layers, with the inner layer having a low index clad ($n_{21} = 1.35$) and the outer layer having an index $n_{22} > n_{21}$. The diameter d1 of core 12 was taken as d1=140 microns, while the outside fiber diameter d2 was taken as $d_2$=250 microns.

The simulations showed that the amount of optical power carried by LDF fibers 10 in cores 12 and claddings 14 of LDFs 10 by light portion 52P was about 36% of the optical power outputted by LED source 50, i.e., the coupling efficiency CE was 0.36. The actual optical power carried by cores 10 is about half of this amount, i.e., 18% of the total outputted optical power.

FIG. 4A is a side view of LDF 10 wherein an end portion of the cladding 14 has been removed to expose the core 12 in the process of forming an LDF core bundle at the end of an LDF bundle. FIG. 4B is an end-on view similar to FIG. 2 of LDF bundle 20 that has an LDF core bundle end section ("LDF core bundle") 30. LDF spaces 24 are filled with material 26, wherein $n_1 < n_M \leq n_2$. In this case, nineteen cores 12 can be packed into same 1 mm diameter $D_B$ that included only nine cores when entire LDF fibers 10 were used at the end of LDF bundle 20. FIG. 4B shows endface 28 as having a generally circular shape as indicated by the dashed-line circle 29, thought the actual shape is more hexagonal.

Figure 4C:
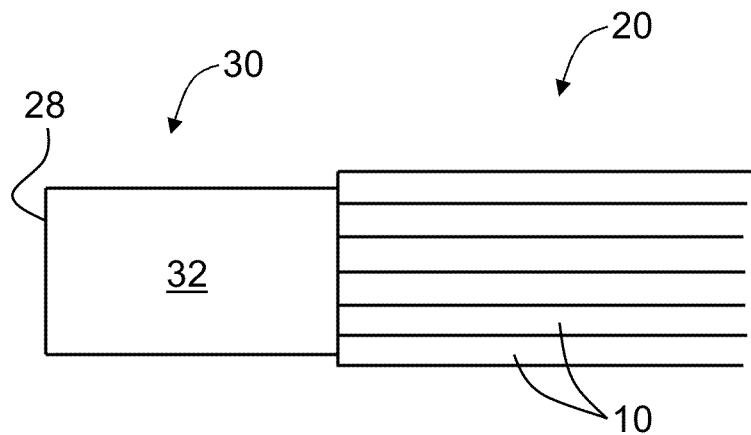
FIGS. 4C and 4D are cross-sectional views of example LDF bundles that include an LDF core bundle end section formed by fusing the exposed cores at the end of each LDF optical fiber.
Figure 4D:
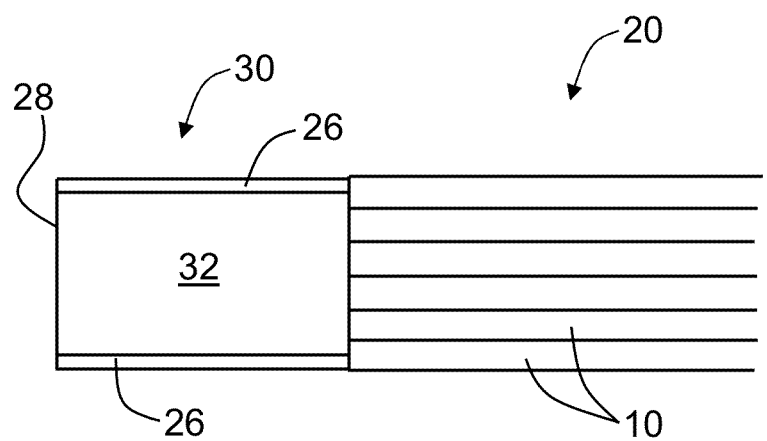

FIG. 4C is a cut-away view of an example embodiment illustrates an example embodiment wherein the LDF core bundle 30 of LDF bundle 20 is formed by fusing cores 12 to form a solid-glass fused-core section 32 at the end portion of the LDF bundle. This fused-core embodiment obviates the need for material 26 residing between cores 12, as shown in FIG. 4B. FIG. 4D is similar to FIG. 4C and shows lower index clad material 26 surrounding the fused-core section 32 of fused-core LDF core bundle 30 so that the numerical aperture $NA_B$ of LDF bundle 20 substantially matches the single-fiber numerical aperture $NA_F$.

Figure 5A:
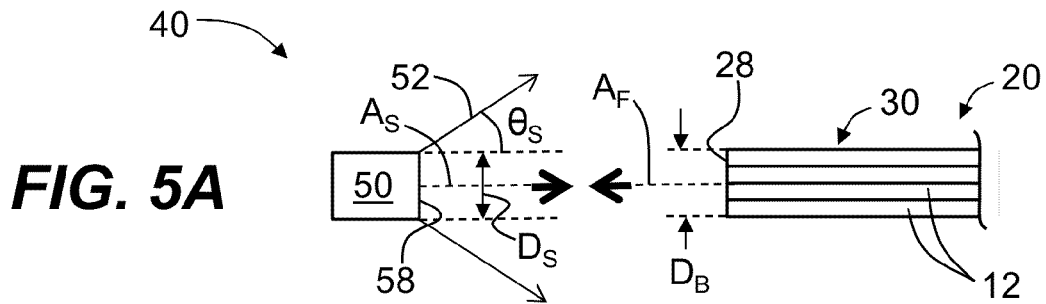
FIG. 5A and FIG. 5B are similar to FIGS. 3A and 3B and illustrate an example light-coupling apparatus wherein the LDF bundle includes the LDF core bundle into which light from the LED source is coupled.
Figure 5B:
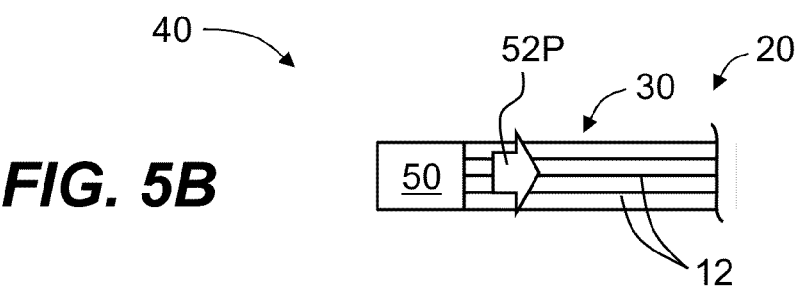
Figure 5C:
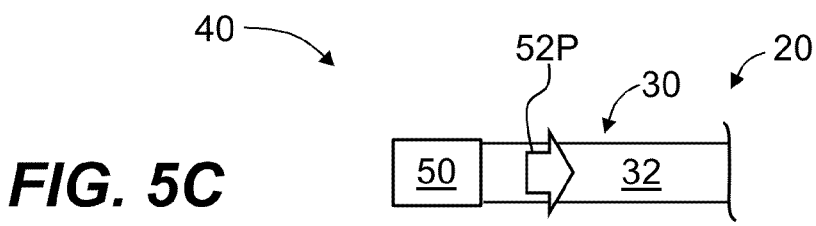
FIG. 5C is similar to FIGS. 5A and 5B, and illustrates an example wherein the LDF bundle is a solid piece of glass formed from the fused cores as illustrated in FIGS. 4C and 4D.

FIGS. 5A and 5B are similar to FIGS. 3A and 3B but wherein LDF bundle includes LDF core bundle 30. FIG. 5C is similar to FIGS. 5A and 5B, and illustrates an example wherein the LDF bundle is a solid piece of glass defined by fused-core section 32, as illustrated in FIGS. 4C and 4D.

Figure 5D:
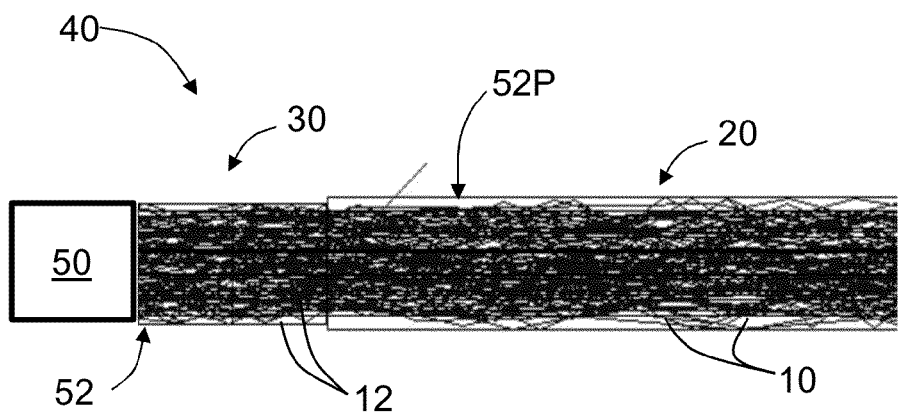
FIG. 5D shows an example light-coupling apparatus similar to that of FIG. 5B, and shows the light portion in the form of light rays whose paths were calculated using numerical simulation.

FIG. 5D shows light-coupling apparatus 40 similar to that of FIG. 5B, but that shows the LDF core bundle 30 at the end of LDF bundle 20, and also shows light 52 and light portion 52P in the form of light rays with paths calculated using numerical simulation.

The numerical aperture $NA_B$ of LDF core bundle 30 is well-approximated by the relationship $NA_B = (n_1^2 - n_{M1}^2)^{1/2}$, since material 26 can be thought of as taking the place of the individual cladding layers 14 and replacing them with a single, thin cladding layer for all of exposed cores 12. This calculation of $NA_B$ also holds for the fused-core embodiment of LDF bundle 20 of FIG. 4D.

For the condition $NA_S = NA_B$, a coupling efficiency CE=92% can be obtained. However, $NA_S > NA_B$, and in an example $NA_S \approx 0.86$ and $NA_B \approx 0.48$, and the losses due to the difference in the numerical apertures is approximated by $[NA_B/NA_S]^2$, which is $\approx 0.31$, so that the actual maximum coupling efficiency CE that can be obtained is estimated by:

$$CE = (0.92) \cdot (0.31) \approx 0.29.$$

Figure 6:
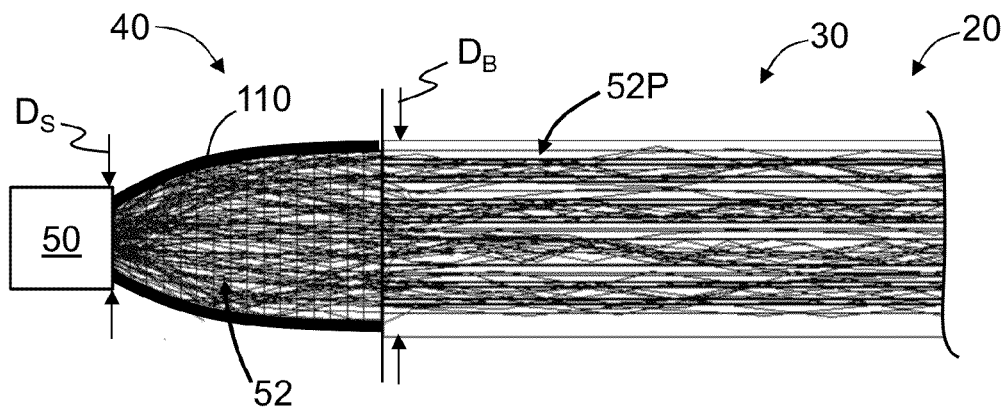
FIG. 6 illustrates an example embodiment of a light-coupling apparatus that employs a reflective concentrator to match the numerical aperture of the LED source to the LDF bundle.

In an example, it is thus desirable to try to match the numerical apertures $NA_S$ and $NA_B$ of the LED light source 50 and the LDF bundle 20. FIG. 6 illustrates an example embodiment of a light-coupling apparatus 40 that includes LED light source 50, a reflective concentrator 110, and either LDF bundle 20 or LDF core bundle 30. In an example, reflective concentrator 110 comprises a compact reflector having, for example, a parabolic or a conic shape.

Reflective concentrator 110 is operably arranged and configured to receive light 52 from LED source 60 over the range of $NA_S$ and direct the receive light to LDF core bundle 30 to substantially within the numerical aperture $NA_B$. The light-coupling apparatus 40 enables LED source 50 to be relatively small (i.e., having a diameter $D_S < D_B$) because reflective concentrator 110 serves to match $NA_S$ to $NA_B$ at the expense of the beam diameter increase, or a reduction of the LED source size (i.e., diameter $D_S$), depending on the size of $D_B$.

For light-coupling apparatus 40 according to FIG. 6 that utilizes LDF bundle 20 without LDF core bundle 30, the coupling efficiency improves from 0.35 to 0.46, an increase of about 25%. For a light-coupling apparatus 40 according to FIG. 6 that utilizes LDF core bundle 30 with material 26, the coupling efficiency CE was measured at 0.57.

Figure 7:
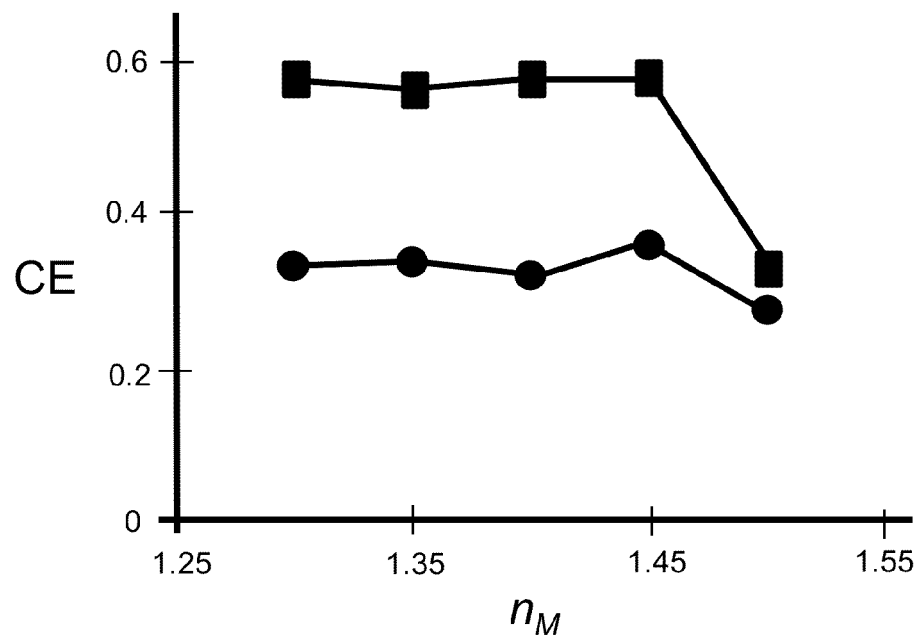
FIG. 7 is a plot of the coupling efficiency CE versus the refractive index $n_M$ of the material that resides in the spaces between the LDF fiber cores, for the light-coupling apparatus of FIG. 5D (circles) and the light-coupling apparatus of FIG. 6 (squares)

FIG. 7 is a plot of the material refractive index $n_{M1}$ vs. the coupling efficiency CE for the example coupling assemblies 40 shown in FIG. 5D (circles) and in FIG. 6 (squares). The plot shows an optimal coupling efficiency CE=0.35 for the light-coupling apparatus 40 of FIG. 5D (butt coupling) when the material index $n_{M1} \le n_1$, for $n_1=1.45$. For $n_{M1}>n_1$, then the coupling efficiency CE efficiency drops.

For the light-coupling apparatus of FIG. 6 that employs a smaller LED source 60 in combination with reflective concentrator 110, the coupling efficiency CE=0.57 when $n_{M1} \le n_1$ but drops steeply for $n_{M1}>n_1$.

Because the amount of optical power emitted by an LED is proportional to its size $D_S$, the butt-coupling configuration for light-coupling apparatus 40 can be used in cases where the most optical power needs to be coupled into LDF bundle 20 with less regard to coupling efficiency. On the other hand, the reflective concentrator configuration of light-coupling apparatus 40 can be used when high coupling efficiency is called for.

For example, if LED source 50 has a diameter $D_S=300$ μm and emits 1 mW power, then 0.57 mW can be coupled into LDF core bundle 30 having a diameter $D_B=900$ μm and material 26 with $n_M<n_1$. When LED source 50 has a size $D_S=900$ μm and emits 9 mW, and the butt-coupling configuration of light-coupling apparatus 40 is employed, then (9 mW)·(0.35)=3.2 mW can be coupled to bundle, which is about six times more than for the reflective concentrator configuration using the smaller LED source.

Preparing the Endface of the LDF Bundle

Figure 8A:
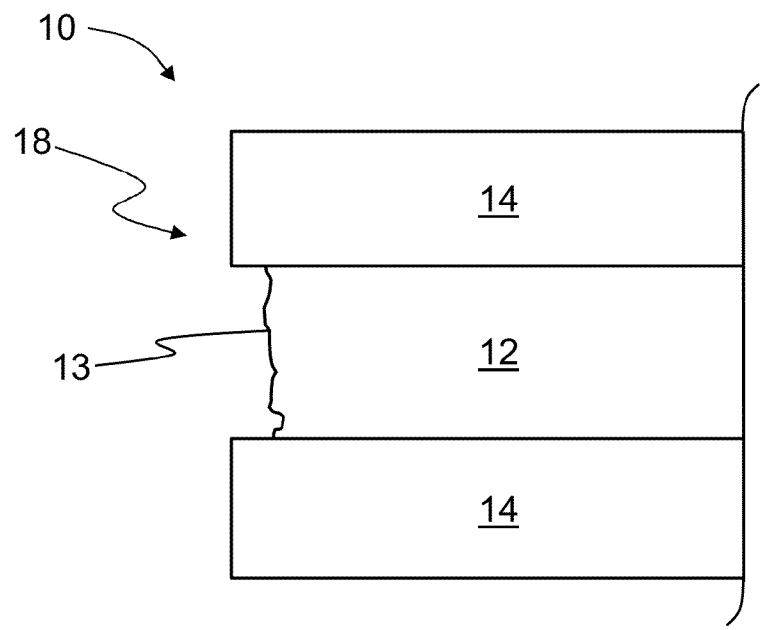
FIG. 8A is a close-up view of the end of an LDF fiber that has been cleaved, showing how the core is fractured, leaving a rough end that requires polishing.

FIG. 8A is a close-up end view of an example LDF 10 that has been cleaved. The LDF fiber 10 shows core 12 having a rough end 13. Usually, cleaved LDFs 10 have to be polished so that rough end 13 becomes a smooth end. The polishing process is usually slow and adds expense to the overall process of forming LDF bundle 20.

Figure 8B:
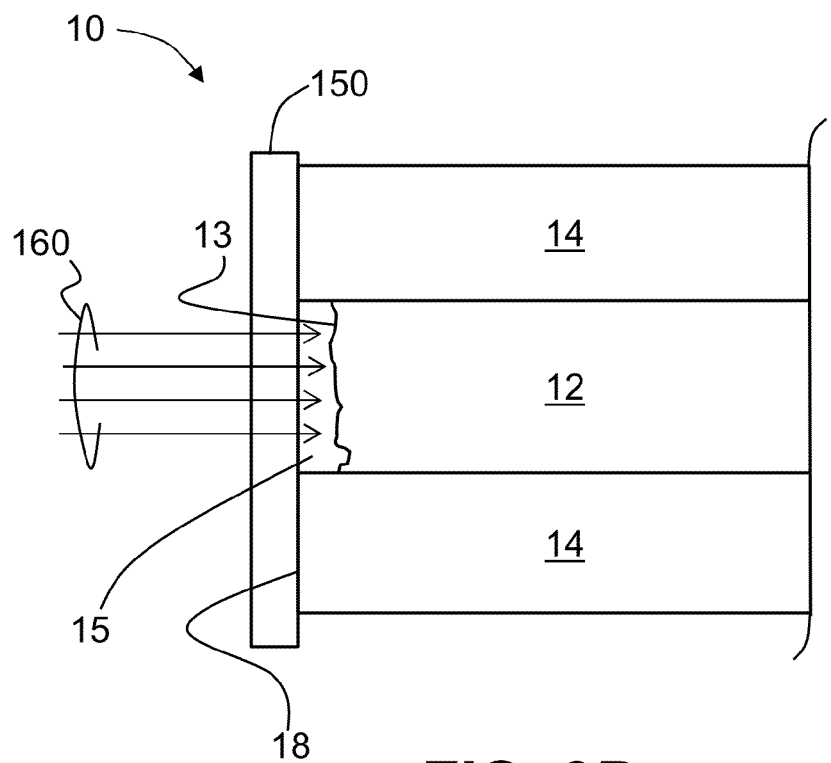
FIG. 8B shows the LDF fiber of FIG. 8A, where a UV-curable material is provided on the rough end and a transparent plate is used to form a flat surface on the material as the material is cured with ultraviolet (UV) light directed through the transparent plate.
Figure 8C:
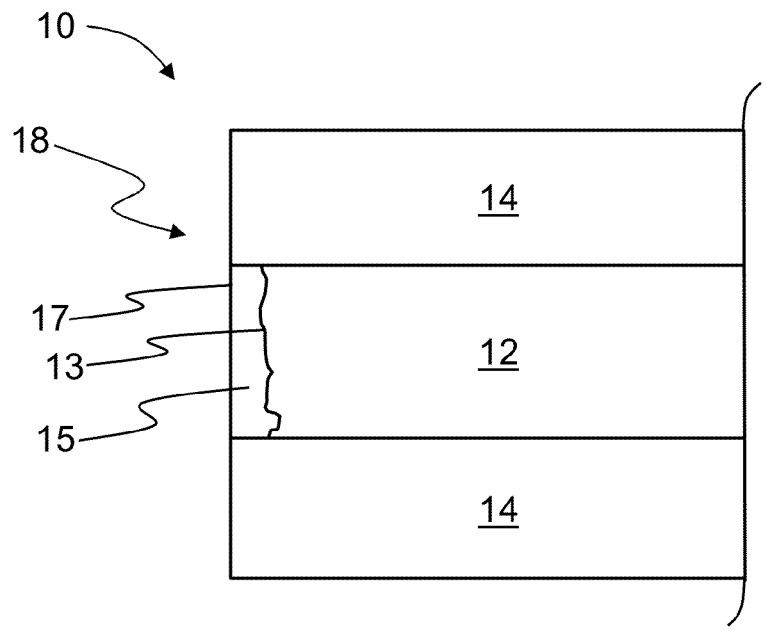
FIG. 8C shows the result of the process illustrated in FIG. 8B, wherein the material has a flat surface, thereby obviating the need to polish the LDF fiber.

FIG. 8B is similar to FIG. 8A and shows a material 15 added to rough end 13, wherein material 15 has a refractive index $n_{15}$ that is relatively low, e.g., about the same as the core index $n_1$. An example material 15 is a UV-curable polymer or glue, e.g., a fluoroacrylate polymer. In an example illustrated in FIG. 8B, a flat fiber endface 18 can be accomplished by depositing material 15 onto rough end 13, and then pressing the endface and the material against a flat, non-stick transparent plate 150. The material 15 is then irradiated with UV light 160 to cure the material and form a flat, smooth hardened surface 17. The result of the process is a smooth endface 18 at core 12, is shown in FIG. 8C.

Light-Coupling Apparatus with Transparent Housing

Figure 9A:
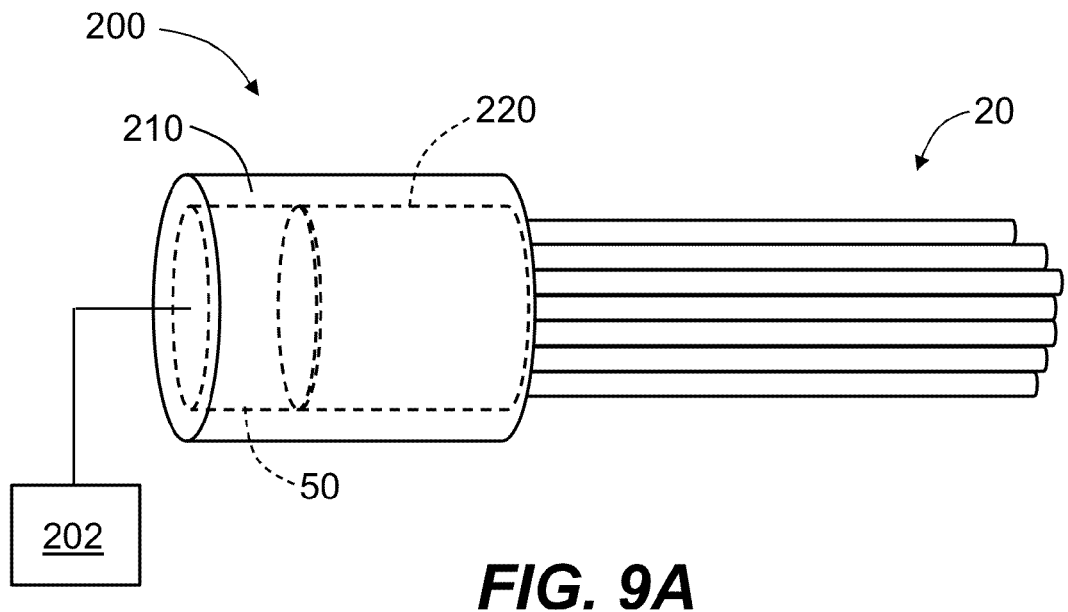
FIG. 9A is an elevated side view of an example light-coupling apparatus that employs a transparent housing.

FIG. 9A is an elevated view of an example light-coupling apparatus 200 that includes a transparent housing 200. Also shown in FIG. 9A is a power supply 202 for LED source 50, which is contained within housing 200, as discussed below. In another example, power supply (e.g., a battery) resides within housing 200.

Figure 9B:
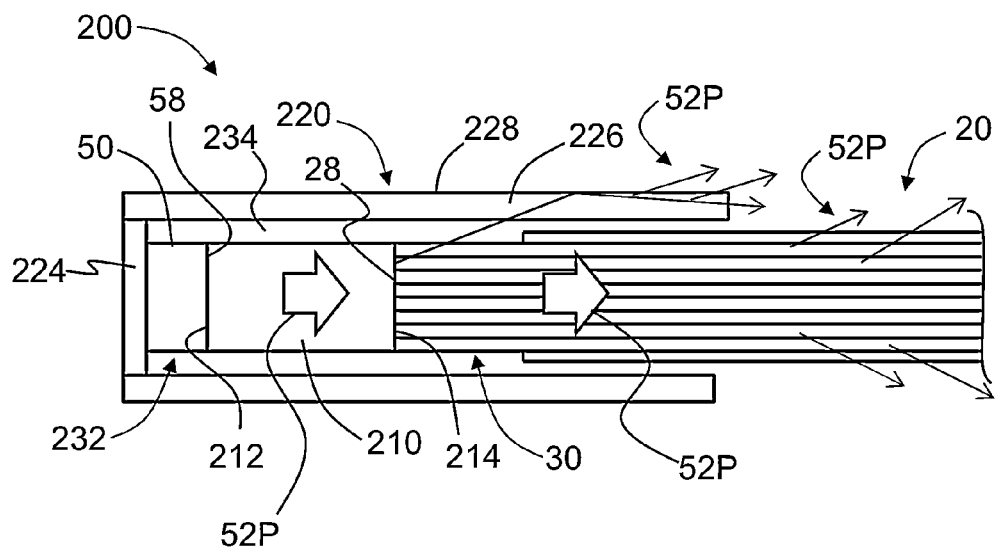
FIG. 9B is a cross-sectional view of an example of the light-coupling apparatus of FIG. 9A, wherein the housing interior defines a gap that is filled with a gas such as air.

FIG. 9B is a cross-sectional view of an example light-coupling apparatus 200 wherein LED source 50 is coupled to LDF bundle 20 via a transparent rod 210, such as a glass rod. In an example, transparent rod 210 is substantially non-scattering. Light-coupling apparatus 200 includes a transparent housing 220 that has an endwall 224 and a sidewall 226 with an outer surface 228. In an example, sidewall 228 has the shape of a cylindrical tube. Endwall 226 and sidewall 228 define a housing interior 232 that contains LED source 50, transparent rod 210 and an end portion of LED bundle 20, which in an example include LDF core bundle 30. Transparent rod has ends 212 and 214, and in an example embodiment output end 58 of LED source 50 is butt-coupled to end 212 of transparent rod 210 while endface 28 of LDF core bundle 30 is butt-coupled to end 214, as shown. The unoccupied portion of interior 232 defines a gap 234. In an example, gap 234 is filled with a gas (e.g., air), as shown in FIG. 9A.

In the operation of light-coupling apparatus 200, light portion 52P from LED source 50 enters end 212 of transparent rod 220 and travels therethrough to end 214 without substantial scattering. Some of light portion 52P is then coupled into LDF core bundle 30, while some of light portion 52 traveling at higher angles is trapped in sidewall 226 and travels therein by total internal reflection, while some of light portion 52 travels straight through the sidewall. In an example, housing 220 is made of glass, polymer, plastic or thermoplastic (e.g., PMMA) material, and is configured to be light diffusing or light scattering, e.g., to diffuse or scatter light 52. In an example, the light-scattering properties of housing 220 are due to scattering centers (e.g., TiO2) within the material that makes up sidewall 24.

Figure 9C:
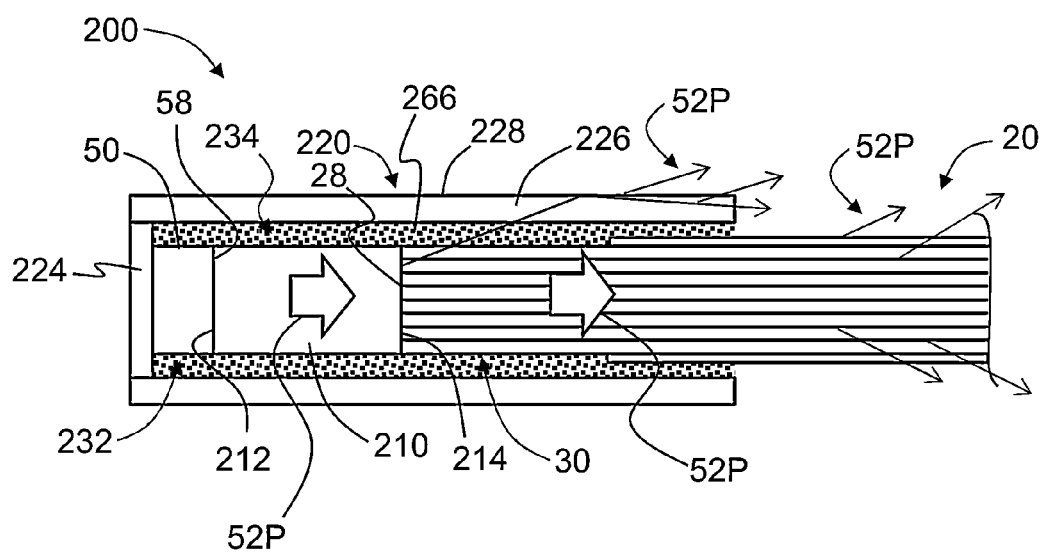
FIG. 9C is similar to FIG. 9A, but wherein transparent material fills the gap.

FIG. 9C is similar to FIG. 9B and includes a material 266 of refractive index $n_{M2}$ within gap 234. In an example, housing 220 has a refractive index $n_H$, wherein $n_H>n_{M2}$ and $n_{M2}<n_1$, where $n_1$ is the (base) refractive index of core 12. In an example, material 266 serves as an adhesive that maintains LED source 50, transparent rod 210 and LDF bundle 20 in relative alignment and fixed within housing 200. In an example, material 266 is the same as material 26 so that $n_{M1}=n_{M2}$.

Figure 9D:
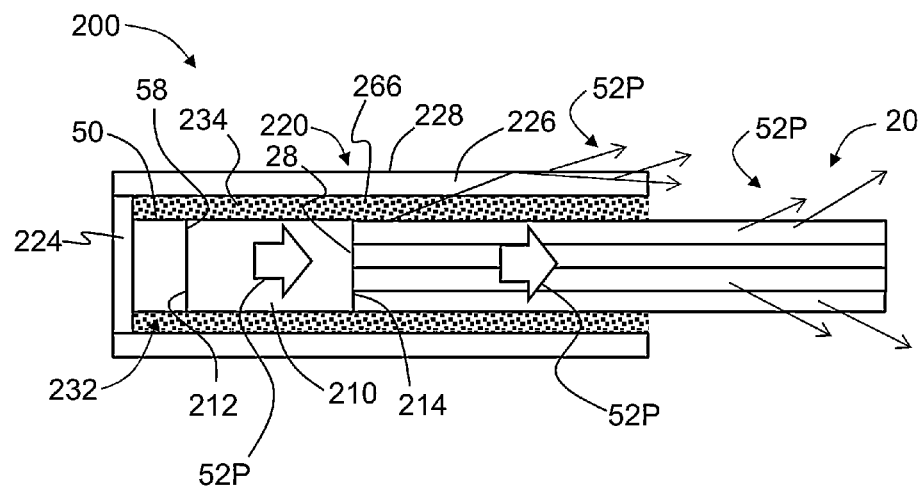
FIG. 9D is similar to FIG. 9B, but wherein the LDF bundle does not include the LDF core bundle end section.

FIG. 9D is similar to FIG. 9C, and illustrates an example embodiment of light-coupling apparatus 200 wherein LDF bundle 20 does not include LDF core bundle 30 so that light portion is coupled directly into core 12 and cladding 14 of LDFs 10, as well as into material 26 that resides in spaces 24 between the LDFs.

Figure 9E:
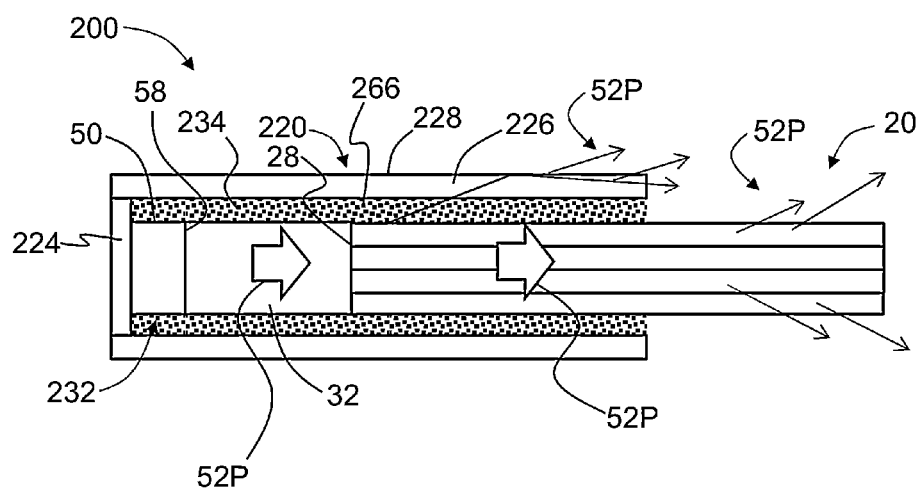
FIG. 9E is similar to FIG. 9D and illustrates an example wherein the LDF bundle of FIG. 4D that has a fused-core section is employed in the light-coupling apparatus.

FIG. 9E is similar to FIG. 9D and illustrates an example wherein the LDF bundle 20 of FIG. 4D that included fused-core 32 is employed in light-coupling apparatus 200. Fused-core 32 is similar to transparent rod 210. In FIG. 9E, material 266 replaces the material 26 shown in the embodiment shown in FIG. 4D.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber apparatus, comprising:
    a plurality of light-diffusing optical fibers each having a cylindrical glass core with a refractive index $n_1$, and a surrounding cladding with a refractive index $n_2<n_1$, wherein an end section of each light-diffusing optical fiber has the cladding removed to expose the core;
    the glass cores being arranged in a tight bundle with spaces between the cores; and
    a transparent material of refractive index $n_M$ residing in the spaces, wherein $n_M \le n_1$.

2. The optical fiber apparatus according to claim 1, wherein the material comprises an ultraviolet-(UV)-curable adhesive.

3. The optical fiber apparatus according to claim 1, wherein the material comprises fluoroacrylate.

4. A light-coupling apparatus, comprising:
    the optical fiber apparatus according to claim 1 having an endface of a first size and shape;
    a light-emitting diode (LED) light source having an output end from which light is emitted and that has a second size and shape that is substantially the same as the first size and shape; and wherein the output end of the LED light source is interfaced with the endface of the optical fiber apparatus to establish a butt-coupling of the light from the LED into the optical fiber apparatus.

5. A light-coupling apparatus, comprising:
the optical fiber apparatus according to claim 1 having a numerical aperture $NA_B$ and an endface of a first size and a first shape;
a light-emitting diode (LED) light source having a numerical aperture $NA_S > NA_B$, an output end of a second size smaller than the first size and having the substantially the first shape, wherein the output end emits light; and
a reflective concentrator operably disposed between the LED light source and the optical fiber apparatus so that at least a portion of the light from the LED light source reflects from the reflective concentrator and enters the endface of the optical fiber apparatus in a manner that substantially matches the numerical aperture $NA_B$ of the optical fiber apparatus.

6. The light coupling apparatus according to claim 5, wherein the reflective concentrator has either a parabolic shape or a conical shape.

7. A light-coupling apparatus comprising:
a light-diffusing-fiber (LDF) bundle having a plurality of light-diffusing optical fibers each having a glass cylindrical core with a refractive index $n_1$, and a surrounding cladding with a refractive index $n_2 < n_1$, wherein an end section of each light-diffusing optical fiber has the cladding removed to expose the glass core, with the glass cores being arranged in a tight bundle with spaces between the cores, and a first transparent material of refractive index $n_{M1}$ residing in the spaces, wherein $n_{M1} \leq n_1$, with the LDF bundle having an endface of a first size and first shape;
a light-emitting-diode (LED) light source having an output end having a second size and second shape that substantially match the first size and shape and that emits light;
a transparent rod having first and second ends and disposed between and in contact with the endface of the LEF bundle and the output end of the LED light source; and
a housing having an interior that contains the LED light source, the transparent rod and the endface of the LDF bundle, the transparent housing having a sidewall that is generally transparent to the light from the LED light source and that scatters a portion of the light that travels within the sidewall.

8. The light-coupling apparatus according to claim 7, wherein the housing interior includes a gap defined by the sidewall, the transparent rod and the bundled cores.

9. The light-coupling apparatus according to claim 7, wherein the housing sidewall has a refractive index $n_H$, and the gap is filled with a second material having a refractive index $n_{M2}$, wherein $n_H > n_{M2}$.

10. The light-coupling apparatus according to claim 9, wherein the first material and the second material are the same material.

11. The light-coupling apparatus according to claim 10, wherein said same material comprises fluoroacrylate.

12. The light-coupling apparatus according to claim 7, wherein the transparent rod comprises glass.

13. An optical fiber apparatus, comprising:
a plurality of light-diffusing optical fibers arranged in a bundle, with each optical fiber having a numerical aperture (NA), a cylindrical glass core with a refractive index $n_1$, and a surrounding cladding with a refractive index $n_2 < n_1$, wherein an end section of each light-diffusing optical fiber has the cladding removed to expose the core;
the exposed glass cores at the end sections of the optical fibers being fused together to form a solid-glass, fused-core section at an end of the bundle; and
a lower-index clad material surrounding the fused-core section of the bundle to define a fused-core NA that substantially matches the single-fiber NA.

14. The optical fiber apparatus of claim 13, further comprising a light source optically coupled to an input end of the fused-core section.

* * * * *